US009176543B2

(12) United States Patent
Faith et al.

(10) Patent No.: US 9,176,543 B2
(45) Date of Patent: Nov. 3, 2015

(54) ACCESS USING A MOBILE DEVICE WITH AN ACCELEROMETER

(71) Applicant: Visa International Service Association, San Francisco, CA (US)

(72) Inventors: Patrick Faith, Pleasanton, CA (US); Mark Carlson, Half Moon Bay, CA (US); Ayman Hammad, Pleasanton, CA (US); Ben Rewis, Oakland, CA (US); Krishna Prasad Koganti, Cupertino, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 14/338,930

(22) Filed: Jul. 23, 2014

(65) Prior Publication Data

US 2015/0198983 A1    Jul. 16, 2015

Related U.S. Application Data

(63) Continuation of application No. 12/953,371, filed on Nov. 23, 2010, now Pat. No. 8,907,768.

(60) Provisional application No. 61/264,543, filed on Nov. 25, 2009.

(51) Int. Cl.
*G08B 21/00* (2006.01)
*H04Q 5/22* (2006.01)
(Continued)

(52) U.S. Cl.
CPC .............. *G06F 1/1694* (2013.01); *G06Q 20/10* (2013.01); *G06Q 20/32* (2013.01);
(Continued)

(58) Field of Classification Search
CPC ....................................................... G08B 21/00
USPC ...................................................... 340/686.1
See application file for complete search history.

(56) References Cited

U.S. PATENT DOCUMENTS 6,295,448 B1    9/2001    Hayes, Jr. et al.
6,587,835 B1    7/2003    Treyz et al.
(Continued)

OTHER PUBLICATIONS

Non-Final Office Action issued on Dec. 10, 2014 for U.S. Appl. No. 12/953,372, 11 pages.
(Continued)

*Primary Examiner* — Jennifer Mehmood
*Assistant Examiner* — John Mortell
(74) *Attorney, Agent, or Firm* — Kilpatrick Townsend & Stockton, LLP

(57) ABSTRACT

Embodiments of the present invention are directed to systems, apparatuses and methods for using a mobile device with an accelerometer to gain access into a secured or restricted area. A first device and a second device interact by making physical contact with each other thereby generating interaction data that is representative of the physical interaction between the first and second device. The first and second device may be mobile phones. The second device may be a point of sale terminal, access point device, or any other stationary (i.e., in a fixed position) device positioned at a line, door, gate, or entrance. A server computer determines, based on interaction data, that the first device and the second device made physical contact. After determining that the first device and the second device made contact, communications may be initiated between the devices. Communications may relate an access transaction comprising an exchange of information, such as credentials, between a prospective entrant (operating the first device) and a gatekeeper (operating the second device) to verify that the prospective entrant is permitted or is not permitted access to a particular area that is secured or restricted by the gatekeeper. Other embodiments are direct to confirmation transactions. Access transaction and confirmation transactions may be combined with a financial transaction using a payment processing network.

20 Claims, 10 Drawing Sheets

(51) Int. Cl.
  *G08B 1/08* (2006.01)
  *G05B 19/00* (2006.01)
  *H04K 1/00* (2006.01)
  *G06F 3/033* (2013.01)
  *G06F 1/16* (2006.01)
  *G06Q 20/10* (2012.01)
  *G06Q 20/32* (2012.01)
  *G06Q 20/38* (2012.01)
  *G06Q 20/40* (2012.01)
  *G06Q 20/42* (2012.01)

(52) U.S. Cl.
  CPC ......... *G06Q 20/3224* (2013.01); *G06Q 20/389* (2013.01); *G06Q 20/40* (2013.01); *G06Q 20/4016* (2013.01); *G06Q 20/42* (2013.01)

(56) References Cited

U.S. PATENT DOCUMENTS

| | | | |
|---|---|---|---|
| 7,089,208 | B1 | 8/2006 | Levchin et al. |
| 7,280,096 | B2 * | 10/2007 | Marvit et al. ............ 345/156 |
| 7,360,248 | B1 * | 4/2008 | Kanevsky et al. ............ 726/21 |
| 7,366,522 | B2 | 4/2008 | Thomas |
| 7,420,464 | B2 | 9/2008 | Fitzgerald et al. |
| 7,427,926 | B2 * | 9/2008 | Sinclair et al. ............ 340/4.2 |
| 7,463,143 | B2 | 12/2008 | Forr et al. |
| 7,535,416 | B2 * | 5/2009 | Fan et al. ............ 342/357.4 |
| 7,575,177 | B2 | 8/2009 | Killian et al. |
| 7,657,486 | B2 * | 2/2010 | Smets et al. ............ 705/41 |
| 7,774,231 | B2 | 8/2010 | Pond et al. |
| 7,861,985 | B2 | 1/2011 | Galvin |
| 7,907,901 | B1 | 3/2011 | Kahn et al. |
| 7,912,591 | B2 * | 3/2011 | Sekiyama et al. ............ 701/1 |
| 7,971,156 | B2 | 6/2011 | Albertson et al. |
| 8,255,323 | B1 | 8/2012 | Casey et al. |
| 8,285,639 | B2 | 10/2012 | Eden et al. |
| 2001/0047488 | A1 | 11/2001 | Verplaetse et al. |
| 2004/0254868 | A1 | 12/2004 | Kirkland et al. |
| 2005/0093868 | A1 | 5/2005 | Hinckley |
| 2006/0186994 | A1 | 8/2006 | Lin et al. |
| 2006/0256074 | A1 | 11/2006 | Krum et al. |
| 2006/0265238 | A1 | 11/2006 | Perrier |
| 2007/0003061 | A1 | 1/2007 | Jung et al. |
| 2007/0008133 | A1 | 1/2007 | Kang |
| 2007/0188323 | A1 | 8/2007 | Sinclair et al. |
| 2007/0213045 | A1 | 9/2007 | Hermansson et al. |
| 2007/0223476 | A1 | 9/2007 | Fry |
| 2008/0041936 | A1 | 2/2008 | Vawter |
| 2008/0147461 | A1 | 6/2008 | Lee et al. |
| 2008/0175443 | A1 | 7/2008 | Khan et al. |
| 2008/0249864 | A1 | 10/2008 | Angell et al. |
| 2009/0065575 | A1 | 3/2009 | Phillips et al. |
| 2009/0066647 | A1 | 3/2009 | Kerr et al. |
| 2009/0143104 | A1 | 6/2009 | Loh et al. |
| 2009/0153342 | A1 | 6/2009 | Thorn |
| 2009/0167486 | A1 | 7/2009 | Shah et al. |
| 2009/0192937 | A1 | 7/2009 | Griffin et al. |
| 2009/0262069 | A1 | 10/2009 | Huntington |
| 2009/0320123 | A1 | 12/2009 | Yu et al. |
| 2010/0075666 | A1 | 3/2010 | Garner |
| 2011/0029400 | A1 | 2/2011 | Scipioni |

OTHER PUBLICATIONS

Final Office Action issued on Apr. 27, 2015 for U.S. Appl. No. 12/953,372, 14 pages.
International Search Report, mailed Jul. 26, 2011 in PCT/US2010/057997, 10 pages.
International Search Report mailed Jul. 27, 2011 in PCT/US2010/058014, 11 pages.
International Search Report mailed Aug. 25, 2011 in PCT/US2010/058005, 10 pages.
International Search Report mailed Aug. 2, 2011 in PCT/US2010/058016, 11 pages.
Fisher, Jon, "The nex Bump Technologies should bump Sequoia," Jon Fisher Blog: The next Bump Technology; http://blogspot.com/../next-bump-technology, (Apr. 13, 2010), 2 pages.
PayPal iPhone App update on Mar. 17, 2010, iTunes Screen shot, (retrieved from: iTunes > App store > Finance > PayPal, an eBay Company), 1 page.
International Search Report in PCT/US2011/067421, mailed on Aug. 29, 2012. 10 pages.
International Search Report in PCT/US2010/057997, mailed Jun. 7, 2012. 7 pages.
Non-Final Office Action issued Dec. 16, 2012 in U.S. Appl. No. 12/953,371, filed Nov. 23, 2010, 18 pages.
Patent Examination Report issued on Dec. 18, 2013 for Australian Patent Application No. 2010324763, 3 pages.
Notice of allowance issued on Feb. 27, 2014 for U.S. Appl. No. 12/952,811, 9 pages.
Notice of allowance issued on May 1, 2014 for U.S. Appl. No. 12/953,371, 11 pages.
Final Office Action issued on Jun. 13, 2014 for U.S. Appl. No. 12/953,368, 29 pages.

* cited by examiner

ACCESS USING A MOBILE DEVICE WITH AN ACCELEROMETER

CROSS-REFERENCES TO RELATED APPLICATIONS

The present application is a continuation of U.S. patent application Ser. No. 12/953,371, filed Nov. 23, 2010, which is a non-provisional application of and claims priority to U.S. Provisional Application No. 61/264,543, filed on Nov. 25, 2009, the entire contents of which are herein incorporated by reference for all purposes.

BACKGROUND

There are many situations in which a person is required to show credentials to gain access to a secure or restricted area maintained by another person or entity. There are countless examples, including security doors with electronic locking mechanisms, events where admission is limited to those with tickets, special members-only lines or areas, airport security, etc. In these situations, one party generally desires access (a prospective entrant) and another party generally regulates access (a gatekeeper). The prospective entrant is typically a person or group of people. The gatekeeper may typically be a person or a business entity or the gatekeeper may be electronic (not actively stationed or monitored by a human being).

A prospective entrant generally presents a photo ID, membership card, or paper ticket. The gatekeeper verifies the credentials supplied by the prospective entrant and permits/denies entrance. There are many disadvantages to this approach, including the fact that the approach requires separate credentials supplied by the prospective entrant. These credentials can be easily lost. If the gatekeeper is a human being, access may be granted accidentally based on human error. Even where the gatekeeper is electronic (e.g., electronic card/badge reader), the access system requires specialized hardware that can be expensive, not readily available, and difficult to set up in smaller scale and/or custom, on-the-fly implementations.

BRIEF SUMMARY

Embodiments of the present invention relate to access and confirmation transactions between two devices with accelerometers that have interacted. For example, a first device may be operated by a customer and a second device may be operated by an employee. The customer and employee may "tap" or "bump" their respective mobile devices with accelerometers (e.g., smart phones) to determine if the customer is permitted to access a specific secured or restricted area (e.g., event, locked room, first class security line at an airport, etc.). After the devices are tapped together a remote server computer, using a pairing algorithm, analyzes interaction data (e.g., accelerometer, location, and/or time data) from the devices to determine whether the devices interacted. If there is a match between two devices that intended to interact and conduct an access transaction, the two devices may communicate directly or via the remote server computer. In other embodiments, the second device may be an access point device. In still other embodiments, interaction data may be used for identification or verification of attendance (e.g., to confirm a security guard was performing "rounds" properly).

One embodiment of the present invention provides for a method of conducting an access transaction. The method comprises receiving first interaction data from a mobile device. The first mobile device comprises a first processor and a first motion sensor coupled to the first processor. The method further comprises receiving second interaction data from an access point device. The access point device comprises a second motion sensor and a second processor coupled to the second motion sensor. The method further comprises determining whether the mobile device physically interacted with the access point device with a server computer using first interaction data and second interaction data. If the mobile device and the access point device move towards each other, communications are initiated between the mobile device and the access point device. Communications may include an access permission message.

One embodiment of the present invention provides for an access point device. The access point device comprises a first sensor coupled to the first processor and a non-transitory computer readable medium coupled to the first processor. The computer readable medium comprises code for implementing a method including generating first interaction data with the first sensor, initiating comparison of first interaction data with second interaction data, wherein second interaction data is generated by a mobile device comprising a second motion sensor coupled to a second processor, and permitting access to a secured area upon receipt of an access permission message.

One embodiment of the present invention provides a method of performing a location confirmation transaction. The method comprises receiving first interaction data from a mobile device. The first mobile device comprises a first processor and a first motion sensor coupled to the first processor. Second interaction data is received from an access point device. The access point device comprises a second sensor and a second processor coupled to the second motion sensor. After first and second interaction data are received, the server computer determines whether the mobile device physically interacted with the access point device using a pairing algorithm. If the mobile device physically interacted with the access point device, interaction data is stored to an interaction database. In some embodiments, communications are initiated between the mobile device and the access point devices after it has been determined that the devices interacted. In some embodiments, the communication includes a transfer of a verification token, which may be stored to a memory.

These and other embodiments of the invention are described in further detail below.

BRIEF DESCRIPTION OF THE DRAWINGS

The disclosure, together with further advantages thereof, may best be understood by reference to the following description taken in conjunction with the accompanying drawings in which.

DETAILED DESCRIPTION

Figure 1:
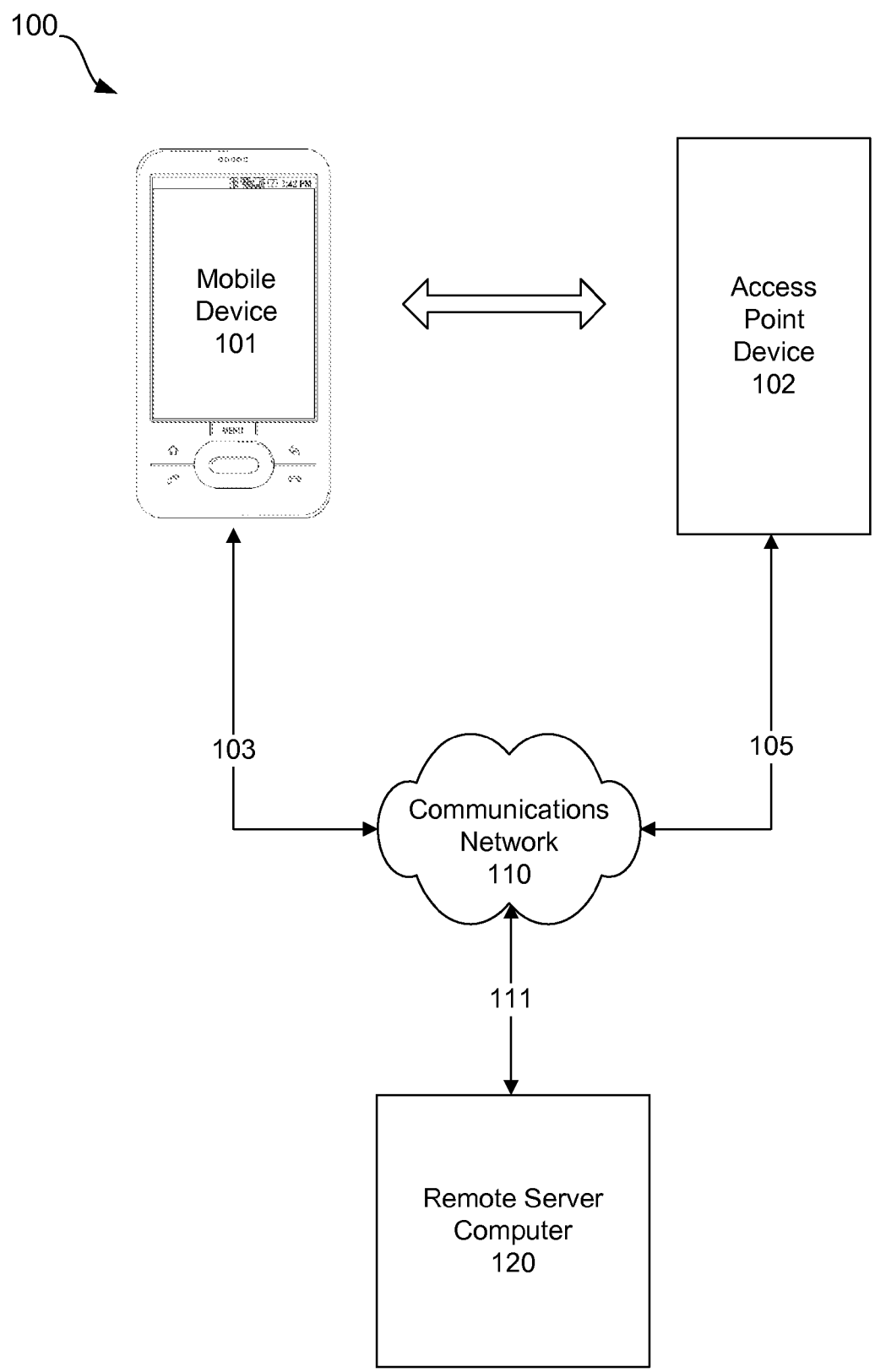
FIG. 1 is a high level diagram illustrating one embodiment of a system in accordance with the present disclosure.

There are many situations in which a person is required to show credentials to gain access to a secure or restricted area or to prove that the person was at a particular location and a particular time. Similarly, a person or entity may wish to validate credentials before granting access to a secure or restricted area or confirm that an employee or agent was at a particular location at a particular time.

A secure or restricted area may be any location where access is limited and a pass, ticket, identification, credentials, or other admission device/card is required to gain access into the secure or restricted area. Access is usually granted through an access point device positioned at a secure or restricted area. For example, any sporting, cultural, or entertainment event may constitute a secure or restricted area. The present invention may also be used to permit access to and payment of fees associated with other venues, such as sports stadiums or arenas, theatres, music halls and amphitheatres, museums, amusement parks, airport lines, banking lines, public transit terminals, farebox, toll booths, toll stations, toll road, gates, or other locations requiring specific access control. Payment for the desired access may be accomplished by linking a payment account to an access account. In this sense, the embodiments of the present invention permit a device to function as a payment mechanism (such as a credit/debit account) and as a access mechanism (i.e., the device can be used as both in a commerce transaction and as an access point device).

An "access transaction" is an exchange of information, such as credentials, between a prospective entrant and a gatekeeper to verify that the prospective entrant is permitted or is not permitted access to a particular area that is secured or restricted by the gatekeeper. In some situations a person may wish to verify or confirm that the person was at a location, or was at a particular location at a particular time. These are referred to as "confirmation transactions."

Although an "access transaction" and a "confirmation transaction" could involve payment of some kind (e.g., deduction of a prepaid amount from an account, a deduction from a debit account, or a charge to a credit account), an "access transaction" and a "confirmation transaction" are types of transactions that differ from a "payment transaction," which includes a transaction that allows one to pay for a good or service at a point of sale. In a "payment transaction," a person does not use a device to access a particular location, but is using the device to pay for a good or service at a point of sale, for example. Thus, in the description of the present invention, "access transaction" is intended to represent a generic transaction in which access is desired to a particular building, system, or venue. Furthermore, in the description of the present invention, "confirmation transaction" is intended to represent a generic transaction in which confirmation that the person was at a location is desired.

One embodiment of the present invention provides a method of conducting an access transaction. The method comprises receiving interaction data from a mobile device and an access point device, determining whether the mobile device physically interacted with the access point device, and, if so, initiating communications between the mobile device and the access point device. The communications include information so that a remote server computer or the access point device can determine whether the user of the mobile device is permitted access in the secured or restricted area. If permitted, the remote server computer and/or the access point device allows access to a restricted area.

A mobile device comprises a first processor and a first motion sensor coupled to the first processor. The mobile device is typically operated by a person who desires access to an access-restricted area or a person who seeks to prove that the person was at a particular location at a particular time. The person moves the mobile device towards the access point device so that the mobile device physically "taps" or "bumps" the access point device.

The movement of the mobile device is recorded by sensors in the mobile device. For example, acceleration may be measured and recorded by an accelerometer. Other characteristics of the movement may be captured by the mobile device. For example, the time when the mobile device is moved may be recorded, and the geographic location of the mobile device may be recorded. Accelerometer, time, location data, and other data representing movement of the mobile device is referred to as interaction data. In embodiments of the present invention, first interaction data from a mobile device is received by a remote server computer. In one embodiment, first interaction data comprises first accelerometer data.

The remote server computer also receives second interaction data from an access point device. The access point device comprises a second motion sensor and a second processor coupled to the second motion sensor. The second motion sensor may comprise an accelerometer, and second interaction data may comprise second accelerometer data. The access point device may further comprise a non-transitory computer readable medium and a display screen, and it may be a handheld device operated by a person.

The remote server computer determines whether the mobile device interacted with the access point device using first interaction data and second interaction data. The remote server computer may compare data which comprises first and second interaction data. In one embodiment, the remote server computer compares first acceleration data and second acceleration data. In another embodiment, the remote server computer may compare first and second time data. In other embodiments, the remote server computer may compare first and second location data. The remote server computer may compare any combination of first and second acceleration data, first and second time data, or first and second location data. A pairing algorithm takes first and second interaction data as input and determines whether the mobile device and the access point device moved towards each other or made physical contact.

If the mobile device and the access point device moved towards each other, the remote server initiates communications between the mobile device and the access point device. In one embodiment, the access point device queries an access database to determine whether an operator of the mobile device is permitted access. In another embodiment, the computer server queries an access database to determine whether an operator of the mobile device is permitted access. In other embodiments, the access database is part of the remote server computer or the access point device.

In response to an access request message (sent by the mobile device via access point device or computer server), an access permission message is sent to one of the mobile device or the access point device. In one embodiment, the access permission message is sent to the access point device, which may be in operative communication with a door, gate, turnstile, or other mechanism that physically restricts access to an area. In other embodiments, the remote server computer may be in operative communication with a door, gate, turnstile, or other mechanism that physically restricts access to an area.

One embodiment of the present invention provides an access point device. The access point device includes a first sensor coupled to the first processor and a non-transitory computer readable medium coupled to the first processor. The computer readable medium contains an application for generating first interaction data with the first sensor. The first interaction data is recorded by the first sensor in the access point response, typically, in response to a physical interaction between the access point device and a mobile device operated by a user. The mobile device comprises a second motion sensor coupled to a second processor and generates second interaction data. The first sensor may comprise an accelerometer or pressure sensor. The second motion sensor may comprise an accelerometer.

One or both of the mobile device and access point device initiate a comparison of the first interaction data with the second interaction data by sending the data to a remote server computer. The first and second interaction data may comprise accelerometer data, geographic location data, and time data. Using a pairing algorithm, which takes first and second interaction data as input, the remote server computer compares any combination of first and second acceleration data, first and second time data, or first and second location data to determine whether the mobile device and the access point device moved towards each other or physically interacted.

If the devices moved towards each other or physically interacted, an access request message is generated by any of the mobile device, access point device, or remote server computer. The access request message is a message that requests the access permissions of a user associated with the mobile device. If the user is permitted into a specific restricted area, an access permitted message is generated. If the user is not permitted into a specific area, an access denied message is generated. The access point device may have a display screen, which may display access information on the display screen. The access permitted or access denied message may be displayed on the mobile device.

One embodiment of the present invention provides a method of performing a location confirmation transaction. The method comprises receiving first interaction data from a mobile device. The first mobile device comprises a first processor and a first motion sensor coupled to the first processor. Second interaction data is also received from an access point device. The access point device comprises a second sensor and a second processor coupled to the second motion sensor. After first and second interaction data are received, the server computer determines whether the mobile device physically interacted with the access point device, using a pairing algorithm. If the mobile device physically interacted with the access point device, interaction data is stored to an interaction database. In some embodiments, communications are initiated between the mobile device and the access point devices after it has been determined that the devices interacted. In some embodiments, the communication includes a transfer of a verification token, which may be stored to a memory.

Additional details regarding embodiments of the invention are described below.

I. Exemplary System

FIG. 1 is a high level diagram illustrating one embodiment of a system 100 capable of performing the disclosed method. The system 100 includes a mobile device 101, an access point device 102, a communications network 110, and a remote server computer 120. The elements of the system 100 are in operative communication through communication channels 103, 105, and 111.

Embodiments of the present invention relate to an access transaction between two devices. As used herein, an "access transaction" may include any suitable communication between two devices where a first device is operated by a user who would like to gain access into a particular area and where a second device verifies that the first device (or user associated with the first device) is permitted to access a secured area. For example, an access transaction include use of a mobile phone at a entrance gate or turnstile of an event to gain admission to the event. Another example of an access transaction is an electronic security door.

Embodiments of the present invention relate to a confirmation transaction. As used herein, a "confirmation transaction" may include any suitable communication where a first device is operated by a user who would like to prove that he or she was at a particular area and/or at a particular time, where a second device is used to confirm that a person was at a particular area at a particular time. For example, to ensure that security guards might have to prove they are doing their rounds properly.

The mobile device 101 comprises a processor and a motion sensor coupled to the processor. In one embodiment, the motion sensor is an accelerometer. For example, the mobile device 101 may be a mobile phone, personal digital assistant (PDA), media player, portable game console, etc.

The access point device 102 may be a mobile device, like mobile device 101. Unless indicated otherwise, the term "access point device" refers to the device that is used, in part, to verify access permission in an access transaction or to confirm attendance in a confirmation transaction. For example, a first class or executive member of an airline may have special privileges, such as a faster line through airport security. In embodiments of the present invention, a first class airline passenger would carry a mobile device 101 and would access a special line by using the mobile device 101 at an access point device 102, which might be positioned at the entrance to the special line. An access point device may also refer to a device that verifies that a user of a mobile device was at a particular location at a particular time. For example, security guards might have to prove they are doing their rounds properly. To do this, the security guards might use a mobile device 101 to bump an access point device 102, which will record information about mobile device 101.

The access point device 102 may be in a fixed position. In one embodiment, the access point device may be movable but in a fixed position. In one embodiment, the access point device is, or is part of, a point of sale (POS) terminal. Although the second device can have an accelerometer, the second device could alternatively have another type of sensor such as a pressure sensor.

According to embodiments of the system, devices 101 and 102 can be in any suitable form. In some embodiments, devices 101 and 102 may be linked to transaction accounts and may contain a computer readable medium. The computer readable medium may embody a program containing code to perform embodiments of the invention. Any device that is capable of sensing motion and sending/receiving information to communications network 110 would be suitable.

A transaction account may include credit accounts, debit accounts, and banking accounts, such as checking and savings accounts. Transaction accounts may be associated with transaction cards such as credit cards, debit cards, pre-paid card accounts, gift card accounts, or any other type of payment card. Transaction accounts may contain personal account number (PAN) and other information about the account or account holder.

After moving the first device towards the second device, the second device may be physically "bumped" by the first mobile device. In other embodiments, both the devices are moved towards each other simultaneously, or substantially simultaneously, and while the devices do not physically interact, the movement of the devices is parallel or reciprocal so that it can be determined that the devices are intended to communicate with each other. In other embodiments, both the devices are moved together in a synchronous fashion. For example, the two devices may be held by a single user and shaken together in the same hand.

The processors and the motion sensors in the first and second devices can provide acceleration data, time data (e.g., timestamps), and/or geo-location data (e.g., GPS coordinates) to a remote server computer indicating that they have been intentionally moved and that operators of those devices intend for those devices to interact with each other. Collectively, this data is referred to as "interaction data." Interaction data is data representing the characteristics of an interaction, or attempted interaction, between devices. Interaction data includes accelerometer data. Accelerometer data may include numeric values representing the magnitude and direction of the acceleration as a vector quantity. Interaction data further may include the duration of time period (e.g., the length of time a device was still or near-motionless or the length of time a device was continuously moving). Interaction data may further include the geographic location of the device at the time of an interaction or attempted interaction.

In embodiments of the invention, an accelerometer is used to measure the acceleration that a device with an accelerometer experiences relative to freefall. Single- and multi-axis models can detect the magnitude and direction of the acceleration as a vector quantity. Accelerometers can also be used to sense orientation, vibration and shock. Exemplary devices could be smart phones, Personal Digital Assistants (PDA), tablet computers, and the like. Micro-machined accelerometers are increasingly present in portable electronic devices and video game controllers. Thus, portable devices with accelerometers and processors are commercially available.

An application runs on the devices 101 and 102. For example, the application or program may be an application downloaded from an application store, music store, or an online marketplace. When the application is started, it may connect to the remote server computer 120. In another embodiment, the connection to the remote server computer 120 may occur only when the application needs to communicate with the server computer. Software on the mobile device may store other interaction data and other sensor data. The interaction data may be sent by the mobile devices to the remote server computer 120 via 103 and 105.

The devices may communicate with the remote server computer 120 through any suitable communications channel (e.g., 103, 105, and 111). One exemplary communications network 110 would be communications through the Internet. Other examples of a communications channel could include wired and wireless networks (e.g., WiFi) or local and wide area networks. Communication networks 110 may be a cellular data network (e.g., Edge, 3G, 4G, etc.). Devices 101 and 102 can send and receive messages and data through communication channels 103 and 105 to communications network 110.

Remote server computer 120 is in operative communication with communications network 110 via communication channel 111. Remote server computer 120 uses the accelerometer data and other interaction data as input to a pairing algorithm designed to match interaction of different devices.

Remote server computer 120 receives and monitors accelerometer data from devices 101 and 102. After remote server computer 120 receives accelerometer data and other interaction data, a pairing algorithm attempts to match the data from two interaction attempts by different devices. An interaction attempt is a movement of a device above a predetermined threshold of movement (or acceleration) made by the operator of the device to start communications with another device.

The pairing algorithm allows the remote server computer 120 to match interaction data between any two devices in the world that tap, bump, or otherwise interact with each other. The pairing algorithm takes numerous input (accelerometer data, time data, location information, and other data representative of the interaction event) from devices 101 and 102.

For example, to limit the number of potential matches, the pairing algorithm may examine location data first. In another embodiment, the algorithm may examine timestamp data first. In yet another embodiment, the algorithm may examine accelerometer data first. In still other embodiments, the interaction data from the mobile device may be examined substantially at the same time and different types of interaction data may be assigned differing weights. Location information and/or timestamp data may be more conclusive in determining whether two mobile devices were bumped together than accelerometer measurements. In this case, the location information and/or timestamp data may be given more precedence in the pairing algorithm.

When the remote server computer determines that two devices have interacted, the remote server computer may "connect" the two mobile devices so that they can directly communicate with each other. That is, when the remote server computer 120 determines that devices 101 and 102 have interacted with each other, the server computer 120 may "pair" the two devices. At this point, remote server computer 120 acts as a conduit (via 103, 105, and 111) for communication between the two mobile devices. Communication sent through communication channels 103, 105, and 111 may be encrypted or otherwise secured. Alternatively, devices 101 and 102 may connect directly and may use a session key communicated by the remote server computer.

After the remote server computer determines that two devices have interacted, the device 101 may send credential information to the device 102 to gain access into the area restricted by the device 102. The credential information may be an electronic ticket, a token, or an access pass. The device 101 may send credential information to the device 102 directly, or via the remote server computer 120.

When the remote server computer 120 determines that devices 101 and 102 have interacted with each other, an access request message is sent. An access request message is a request that originates from the device 101 when a user of the device 101 wishes to access a secured area.

The access request message may be sent to the remote server computer 120 from the mobile device 101 via the communications network 110 (103 and 111). In other embodiments, the access request message may be sent directly to the access point device 102 from the mobile device 101. In still other embodiments, the access request message may be sent via the communications network 110 via 103 and 105.

In some embodiments, an access transaction may be combined with a financial transaction, using a transaction account of a consumer that is linked to a mobile device belonging to the customer. Financial transactions between two devices with accelerometers are described in U.S. application Ser. No. 12/952,811, titled "Transaction Using a Mobile Device with an Accelerometer" and filed on Nov. 23, 2010, and U.S.

application Ser. No. 12/953,368, titled "Interaction Terminal" and filed on Nov. 23, 2010. These applications are hereby incorporated by reference in their entirety for all purposes.

The access transaction and the financial transaction may occur at the same time or substantially the same time. In one embodiment, the financial transaction (i.e., a payment transaction or a money transfer) may occur at an entrance gate when a consumer, who has not already paid for a ticket, taps a mobile device against an access point device at the entrance gate. The consumer may also input information describing the type of access or additional features that the consumer desires (e.g., seat location, price, purchase of souvenirs or concessions, etc.). The remote server computer determines that the mobile device and the access point device interacted, as described above. If the desired type of access or additional features are available, the consumer may be presented with an option to confirm the purchase on the mobile device or on the access point device.

If the consumer continues, the remote server initiates an authorization request message using a payment processing network for the payment amount. Clearing and settlement can occur simultaneously. After the authorization request message, clearing, and settlement occur, ticketing information may be stored to the user access database. The user access database may be immediately updated to reflect that the consumer has paid for a ticket and entered the venue. In this respect, access and payment occur at substantially same time.

The payment processing network (not shown) contains payment authorization, clearing, and settlement services. At the end of the day, a normal clearing and settlement process can be conducted by the payment processing network. A clearing process is a process of exchanging financial details between an acquirer and an issuer to facilitate posting to a consumer's account and reconciliation of the consumer's settlement position.

In other embodiments, the authorization request message is sent after the consumer is granted access. If the authorization request message is denied, an usher can look up the seating information of the consumer or a message could be sent to the mobile device alerting the consumer that an alternative payment needs to be arranged. This has the advantage of speeding up the lines at the entrance gate because the gate does not need to wait for an approval message.

The access transaction and the financial transaction may occur at different times. In one embodiment, a consumer taps or bumps a mobile device against a ticket kiosk to request tickets (best available tickets or as specified by user). After the remote server computer determines that the devices interacted, a financial transaction is conducted for the purchase price of the tickets. That is, an authorization request message is generated and sent to the payment processing network for approval. If approved, ticketing information is stored to the user access database. In some embodiments, ticketing information (e.g., an electronic ticket or token) is also transmitted to and stored on the mobile device. At a later time, the consumer taps or bumps the mobile device against an entrance gate. After the remote server computer determines that the devices interacted, an access transaction is conducted, as described above. If the consumer is permitted access, the consumer will be let into the venue by a user or by a gate, turnstile, or door opening. The user accounts database may be updated to reflect that the electronic ticket or token has been used and is no longer valid or has been partially used and is only partially valid (e.g., if only two of four "tickets" were used).

After the customer enters a restricted area following an access transaction, a financial transaction may be conducted for the purchase of additional goods and services. For example, a first interaction between a mobile device and a kiosk may be used to buy tickets to a baseball game. A second interaction between a mobile device and an entrance gate may be used for access to the game. A third interaction and/or subsequent interactions with other terminals or handheld devices might be used to buy merchandise or concessions (e.g., commemorate shirt, a ball cap, program, peanuts, Cracker Jacks, beverages, etc.). Thus, the first and third interactions facilitate a payment transactions, and the second interaction facilitates an access transaction.

In some embodiments, the financial transaction is based on subsequent physical interactions between a consumer's mobile device and a merchant's terminal with an accelerometer (e.g., POS terminal). In other embodiments, no subsequent interaction physical is required to engage in a financial transaction, and the transaction may be conducted based on a prior interaction (e.g., using the user interface on the mobile device through a communication channel obtained during the access transaction).

For example, a customer's mobile device with an accelerometer (or other motion/pressure sensors) may be used to conduct a financial transaction by making physical contact with a merchant's terminal. The customer's mobile device may be a mobile phone or any other mobile device suitable for the customer carrying it on his or her person. The merchant's terminal may be a mobile device, such as a mobile phone, PDA, tablet, handheld device, etc. In other embodiments, the merchant's terminal may be stationary, such as a point of sale (POS) terminal, automated teller machine (ATM), electronic cash register (ECR), kiosk, ticket selling/dispensing terminal, vending machine, magnetic stripe reader device, or personal computer, etc.

When the customer's mobile device makes physical contact with a merchant's terminal, interaction data (e.g., accelerometer data, location data, time data, etc.) is generated. The interaction data generated by each of the customer's mobile device and merchant's terminal is representative of the physical contact. That is, first interaction data is generated by the mobile device based on the external forces applied to the mobile device. Second interaction data is generated by the merchant terminal based on the external forces applied to the merchant terminal.

A server computer determines, based on first and second interaction data, that the customer's mobile device and the merchant's terminal made physical contact and interacted. In other embodiments, a processor associated with the merchant's terminal (rather than, or in combination with, the remote server computer) may determine, based on first and second interaction data, that the mobile device and the merchant terminal made physical contact and interacted.

The server or merchant's terminal may determine that the customer's mobile device and the merchant's terminal made physical contact by using a pairing algorithm. The pairing algorithm analyzes and matches interaction data to determine whether two devices physically interacted. The server or merchant's terminal may receive and analyze any combination of accelerometer, location, and time data. If the accelerometer, location, and/or time data from the customer's mobile device and the merchant's terminal matches, the pairing algorithm can conclude with sufficient certainty that the devices interacted. If any or all of accelerometer, location, and time data from the customer's mobile device and the merchant's terminal are sufficiently similar, it can be concluded that the customer's mobile device interacted with the merchant's terminal and that the customer and the merchant intend to conduct a financial transaction. The pairing algorithm can analyze the interaction data in any suitable order. Any combination of interaction data may be analyzed, including time data, location data, or accelerometer data.

After determining that the customer's mobile device and the merchant's terminal made contact, communications that relate to payment processing may be initiated between the devices. The payment processing may include the sending of an authorization request message and authorization response message through a payment processing network. The payment processing network (not shown) contains payment authorization, clearing, and settlement services. At the end of the day, a normal clearing and settlement process can be conducted by the payment processing network. A clearing process is a process of exchanging financial details between an acquirer and an issuer to facilitate posting to a consumer's account and reconciliation of the consumer's settlement position. For example, VisaNet™ may be used to process a Visa transaction between the operators of a mobile device and an merchant terminal. The payment processing network may communicate with a plurality of issuer, acquirers, and merchants.

A merchant may have an acquiring bank (acquirer) and the merchant's terminal may be in operative communication with the acquirers. A customer may have an issuing bank (issuer) that issued a transaction account that can be used for making payments. The transaction account may be linked or otherwise connected to the customer's mobile device and/or different type of portable consumer device (e.g., a plastic transaction card). Using the payment processing network, a customer and a merchant may conduct a financial transaction. For example, to receive a payment from a customer, the merchant may initiate the sending of an authorization request message by, or through, its acquirer. The acquirer may then forward or send the authorization request message to the issuer associated with the customer's transaction account and linked to a mobile device of the customer. The issuer may approve or not approve of the transaction and respond with an authorization response message. The authorization response message may be sent to the merchant's acquirer and may be forwarded to the merchant. If approved, the transaction is then completed by the merchant and customer.

Figure 2:
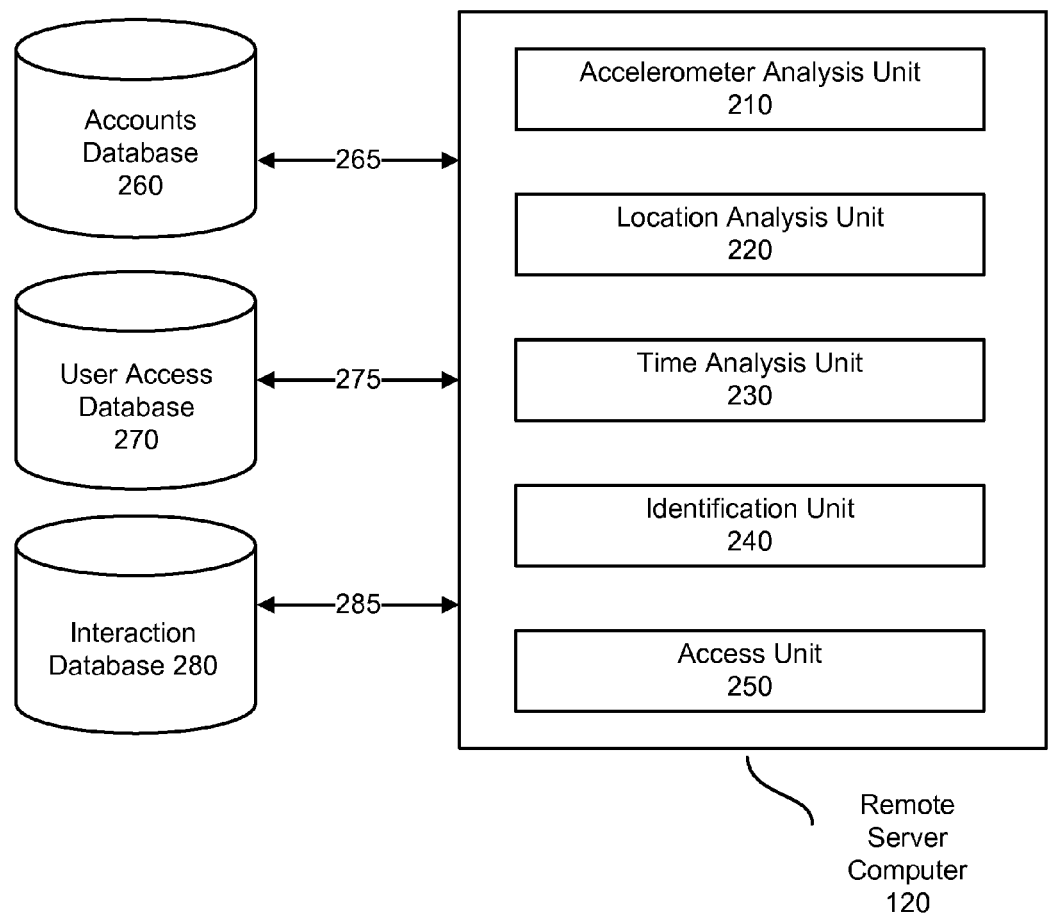
FIG. 2 is a high level diagram illustrating one embodiment of a remote server computer in accordance with the present disclosure.

FIG. 2 depicts an embodiment of the remote server computer 120 which may be in operative communication with the communications network (not shown). Remote server computer 120 may include an accelerometer analysis unit 210, location analysis unit 220, time analysis unit 230, identification unit 240, and access unit 250, which may be used alone or in combination to resolve or "match" devices that have interacted with each other (e.g., made intentional physical contact). Units within the server computer are coupled to a processor. Databases (e.g., 260, 270, and 280) may be associated with the remote server computer 120 and/or in operative communication through communication channels 265, 275, and 285, which may be wired or wireless connections. In some embodiments, databases 260, 270, and 280 are part of the remote server computer.

Accelerometer analysis unit 210 compares accelerometer data from a plurality of devices. Accelerometer data may include the magnitude and direction of the acceleration. Accelerometer data may also include orientation data (such as pitch, yaw, and roll and/or cardinal direction of the device). From the accelerometer data, the accelerometer analysis unit 210 can determine whether two devices intentionally have interacted with each other. For example, if the absolute value of the magnitude of the measured acceleration of two devices is equal, or substantially equal, the accelerometer analysis unit 210 can determine with relative certainty that the two devices have interacted together. In embodiments where magnitude and direction of the acceleration are analyzed by the accelerometer analysis unit 210, it would be expected that devices that are "bumped" together would have substantially equal acceleration magnitude in opposite directions. That is, accelerometer analysis unit 210 can determine with relative certainty that the two devices were "bumped" together if the accelerometer data of two devices was substantially equal and opposite.

Location analysis unit 220 may be used to help further resolve conflicts from interaction data generated by the devices 101, 102. The location analysis unit compares location data from a plurality of devices and determines whether any two devices are sufficiently close when acceleration (above a predetermined threshold) occurred to indicate a likelihood that two devices have interacted with each other. Location data is obtained through GPS units residing in the devices (e.g., 101, 102). Cellular tower data may also be used to determine the location of a device. As discussed above, interaction data from numerous devices is sent to the remote server computer for comparison and analysis. Location data may be used to supplement accelerometer data in order to determine whether two devices have interacted. For example, if two devices with substantially similar acceleration data were also within 100 feet of each other according to location data, there is a high probability that the devices have intentionally interacted with each other.

Time analysis unit 230 may be used to help further resolve conflicts from interaction data generated by the devices 101, 102. The time analysis unit compares time data from a plurality of devices and determines whether any two devices accelerated at the same time, or substantially the same time (e.g., within 5 seconds after adjustments for differences in clocks and time zones). Time data is obtained from the devices. Time data may include a timestamp indicating when acceleration (above a predetermined threshold) started or stopped as well as the duration of the device's movement. For example, the server computer may determine with greater certainty that devices with similar acceleration data have interacted with each other if the time data from the respective devices is also similar.

Identification unit 240 may be used to identify the device associated with any given interaction data. A device may be identified by its phone number, SIM card numbers, serial number, or hardware ID. Identification unit 240 may look up user information or account information associated with a device by querying accounts database 260 or user access database 270.

In some embodiments, the access into a secured area may be determined by the user being a member of a particular group/club or having a particular account. An accounts database 260 stores information about accounts that may be associated with preferred access to a secured area (e.g., frequent flyer, executive member, VIP). Accounts database 260 may store transaction account information. Users of a device according to the present invention may be required to register their devices. As such, the accounts database may include information about enrolled users or devices.

A user access database 270 stores information about what access privileges are associated with a particular mobile device belonging to a particular person. For example, a security guard may be entitled to access all rooms within an office, whereas the janitorial staff may only be permitted to access the particular segments that he or she is assigned to maintain.

The access privileges may be linked to a user's mobile device using various identifiers, including information about the device such as phone number, SIM card numbers, serial number, or hardware ID.

The user access database 270 may also store ticketing information. Ticketing information may correlate a particular mobile device or transaction account to a specific event, event date, event location or time, seat location, number of tickets, or any other information that describes an event where access is limited to those who have paid for a "ticket." The user access database 270 may be updated when a consumer enters a specific event. For example, if a consumer paid for two seats to an event, after the person enters the event by tapping or bumping an access point device, as described above, a server registers that the consumer was granted access and the "ticket" is no longer valid.

The interaction database 280 may information about each interaction or attempted interaction made by a mobile device 101 and an access point device 102. Therefore, there may be a record of the interaction data from every interaction or attempted interaction that has been received by the remote server computer. An interaction data log may be kept on each mobile device and/or access point device in the system as well. Using information on interaction data log (stored locally on mobile devices and access point devices) and the interaction database, it can be confirmed that specific mobile devices and access point devices interacted at specific dates, times, locations, frequencies, etc.

After remote server computer 120 has determined that two devices have interacted, the access unit 250 queries (265, 275) the appropriate databases to determine if the user of the mobile device is permitted to access a particular secured area. If a user of a device is permitted to access a secured area, an access granted message is generated by the remote server computer 120.

In some embodiments, the remote server computer 120 and/or the access point device is in operative communication with a gate, turnstile, door, etc. When an access-granted message is generated, the gate, turnstile, door, etc. may open, permitting access to a secured area. In other embodiments, the access point device may be operated by a person. An access-granted message may be displayed on a user interface of an access point device.

Figure 3A:
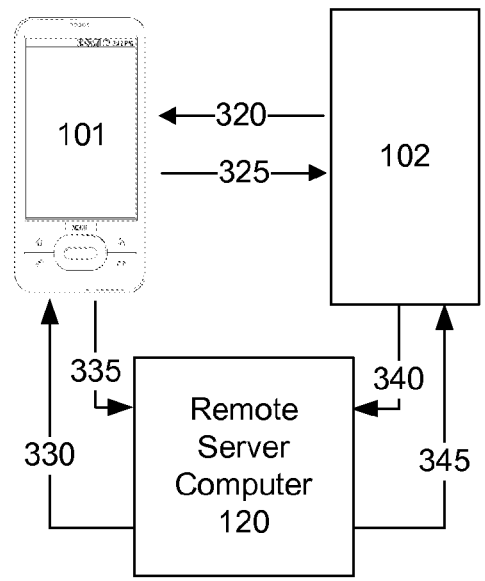
FIGS. 3A-C are high level diagrams illustrating various embodiments of a communication between devices and a remote server computer in accordance with the present disclosure.
Figure 3B:
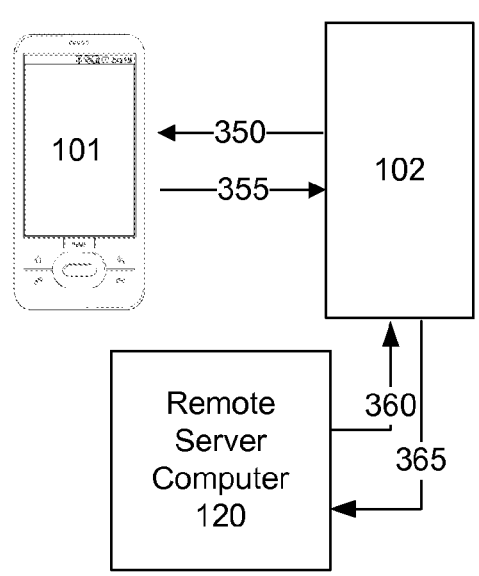
Figure 3C:
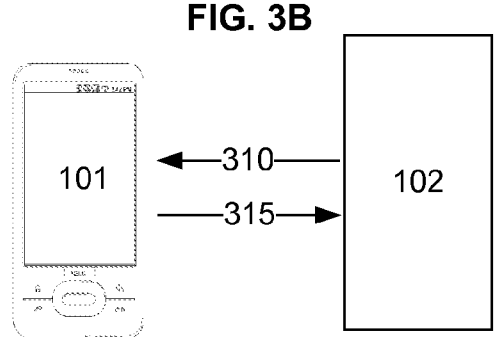

In FIG. 1, device 101 and device 102 do not directly communicate with each other, but communicate with each other via a central server computer. FIGS. 3A-C show various embodiments of the communication flows contemplated by embodiments of the present invention. Although illustrated as mobile phones, in FIGS. 3A-C, devices 101, 102 can be any type of mobile device with an accelerometer. Communications network 110, depicted in FIG. 1, is not shown for the purposes of this illustration. However, one of skill in the art would understand that the devices 101, 102 communicate with remote server computer 120 via a communications network.

FIG. 3A shows a system whereby a remote server computer 120 provides both devices 101 and 102 with session keys, and devices 101 and 102 can communicate directly with each other as long as the session keys are active. Session keys may be based, in part, on the accelerometer data from one or both of the devices 101 and 102. In this embodiment, launch of applications on devices 101 and 102 may automatically initiate a request for the session keys. Devices 101 and 102 may "bump" and communicate with each other. This causes first interaction data to be sent from device 101 to remote server computer 120 via connection 335 and second interaction data to be sent from device 102 to remote server computer 120 via connection 340. Remote server computer 120 determines, based on interaction data, that the operators of the two devices want to exchange information. Session keys may be sent by remote server computer 120 to devices 101, 102 via connections 330, 345. While session keys are active, devices 101 and 102 may directly exchange information through wireless links 320 and 325 (e.g., RF and/or infrared).

FIG. 3B shows a system including two devices 101 and 102 that communicate through wireless links 350 and 355 (e.g., RF and/or infrared) and one of device 101 and device 102 that communicates with a remote server computer 120 via connections 360 and 365. In this embodiment, device 101 could communicate with the remote server computer 120 through device 102 after a session key is generated. Accelerometer data, time-stamp data, etc. can be sent from device 101 to the remote server computer 120 via device 102. The processor in device 102 can send any suitable interaction data to the remote server computer 120 after devices 101 and 102 have interacted with each other.

FIG. 3C shows a system including device 101 and device 102 communicating with each other without the use of an intermediate remote server computer 120 after a session key is generated. In this embodiment, the two devices 101 and 102 may communicate with each other through wireless links 310 and 315 (e.g., RF and/or infrared).

II. Exemplary Methods

Figure 4A:
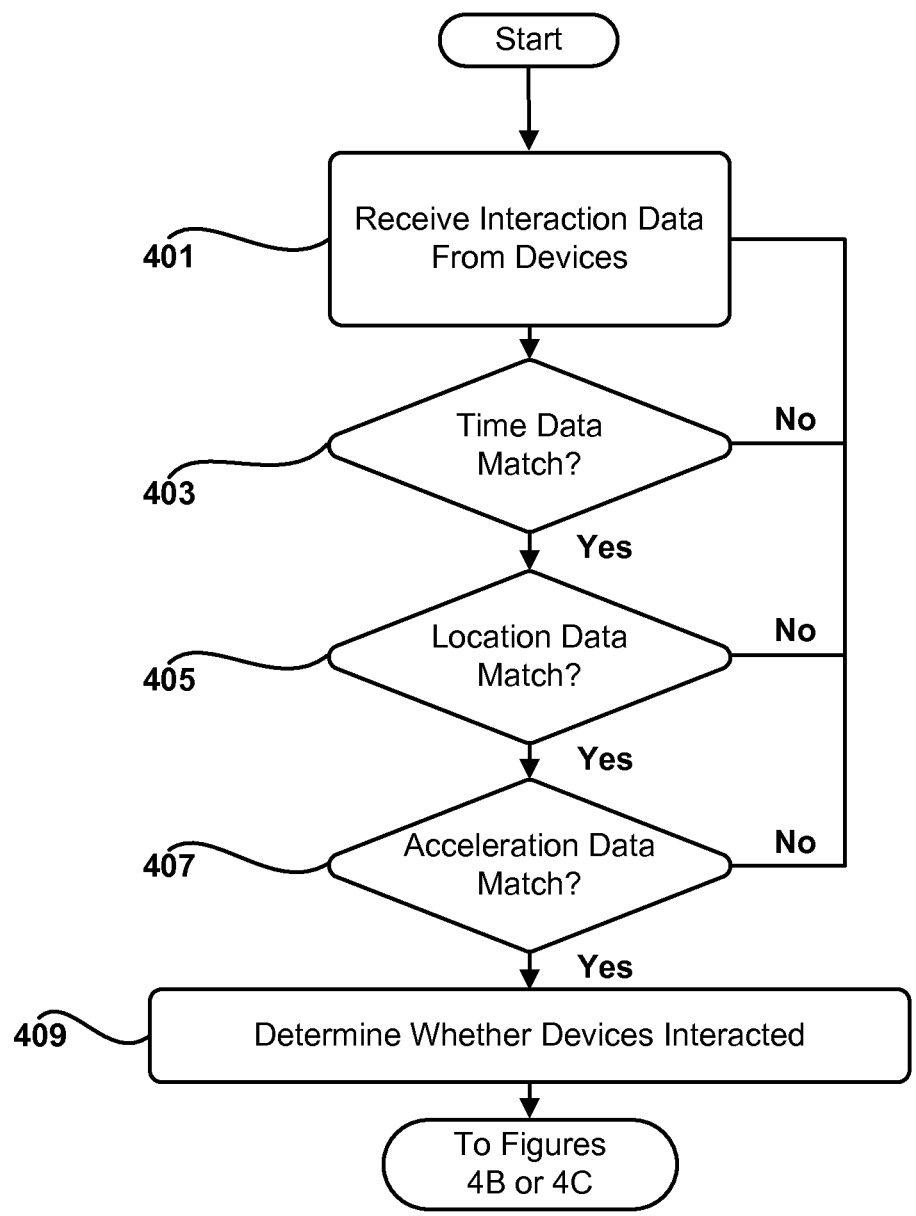
FIGS. 4A-C are high level flow diagrams illustrating embodiments of a method of the present invention.

FIG. 4A is a high-level flow diagram illustrating one embodiment of a method of resolving interaction data from a plurality of devices. The method in FIG. 4A can be described with reference to FIGS. 1 and 2.

In step 401, remote server computer 120 receives accelerometer, location, and time data from devices 101, 102 (in FIG. 1). In step 403, time analysis unit 230 (in FIG. 2) compares the time data from device 101 with time data from device 102. If the time data matches, or is substantially the same, the location analyzer unit 220 compares the location data from device 101 with location data from device 102 (step 405). If the time data does not match, remote server computer 120 returns to state 401 and monitors and receives accelerometer, location, and time data from devices.

If the location data matches, or the information indicates that the devices are substantially close, the accelerometer analysis unit compares the accelerometer data from device 101 with accelerometer data from device 102 (step 407). If the location data does not match, remote server computer 120 returns to state 401 and monitors and receives accelerometer, location, and time data from mobile devices.

If the accelerometer data matches, or is substantially similar, remote server computer 120 can determine with sufficient certainly that the devices 101, 102 intended to interact (step 409). If the accelerometer data does not match, remote server computer 120 returns to state 401 and monitors and receives accelerometer, location, and time data from mobile devices. The receipt and analysis of data illustrated in steps 401, 403, 405, and 407 may be completed in any suitable order. For example, analysis of the accelerometer data (step 407) may be completed before analysis of time data (step 403).

Figure 4B:
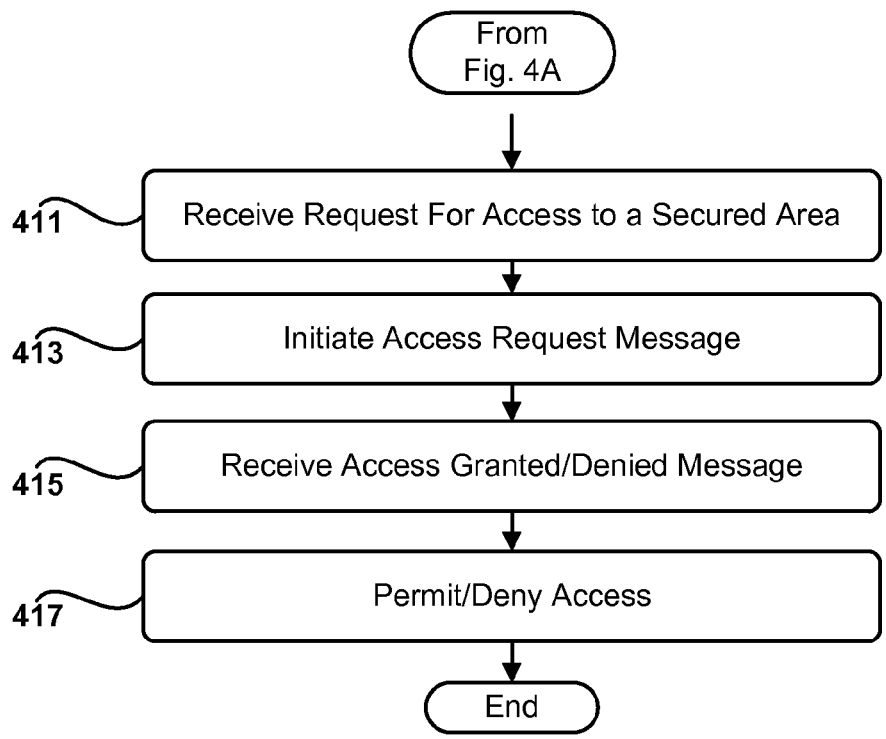

FIG. 4B is a high level flow diagram illustrating one embodiment of conducting an access transaction.

In step 411, the remote server computer 120 receives a request for access to a secured area. The request for access may include information about the user associated with the device 101 or information about an account that is associated with the user or device. The request for access may include other information, such as a password, other security data, or information that only an authorized person knows.

In step 413, remote server computer 120 queries a database to determine whether access is permitted. In other embodiments, remote server computer 120 may initiate an access request message and then receive an access granted or an access denied message (step 413). In still other embodiments, the computer server can combine the steps of 411 and 413 (the initiating of an access request message and the receiving of an access granted or denied message).

In step 417, access is permitted or denied. The remote server computer 120 and/or the access point device is in operative communication with a gate, turnstile, door, etc. When an access granted message is generated, the gate, turnstile, door, etc. may open, permitting access to a secured area. When an access denied message is sent, the gate, turnstile, door, etc. does not open. In other embodiments, the access point device may be operated by a person and it may be handheld. The access granted/denied message may be displayed on a user interface of the access point device. Other specific details of this method are described above with respect to FIGS. 1-2.

Figure 4C:
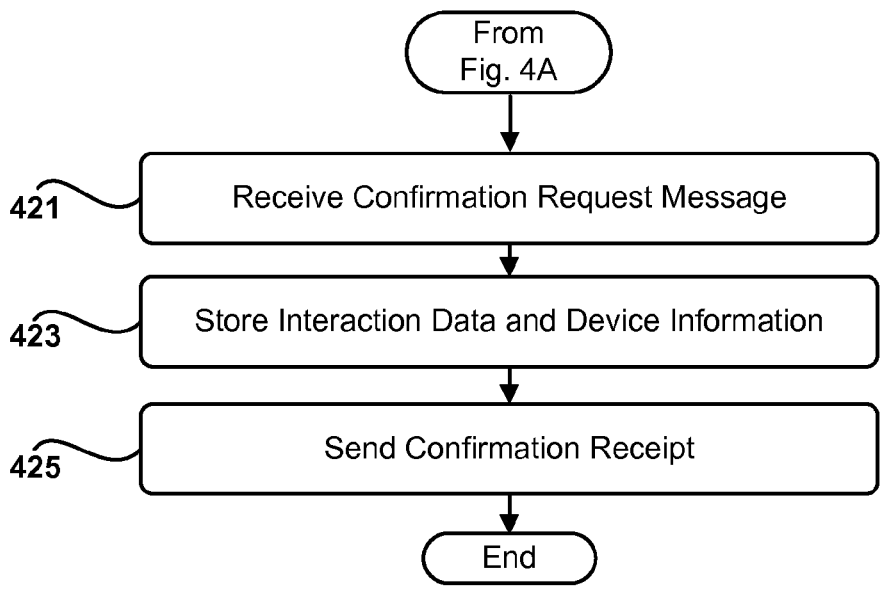

FIG. 4C is a high level flow diagram illustrating one embodiment of conducting an confirmation transaction. In step 421, the remote server computer 120 receives a confirmation request message. A confirmation request message is a message from a mobile device of a person who wants to verify that he or she was at a particular location or was at a particular location at a particular time. The confirmation request message may include information about the user associated with the device 101 or information about an account that is associated with the user or device.

In step 423, the remote server computer 120 stores a device identifier and interaction data in the interaction database (280 in FIG. 2). In some embodiments, only a device identifier is stored in a database. In step 425, the remote server computer 120 sends a confirmation receipt to one or both of device 101 or 102 via the communications network 110.

III. Exemplary User Interface

Figure 5A:
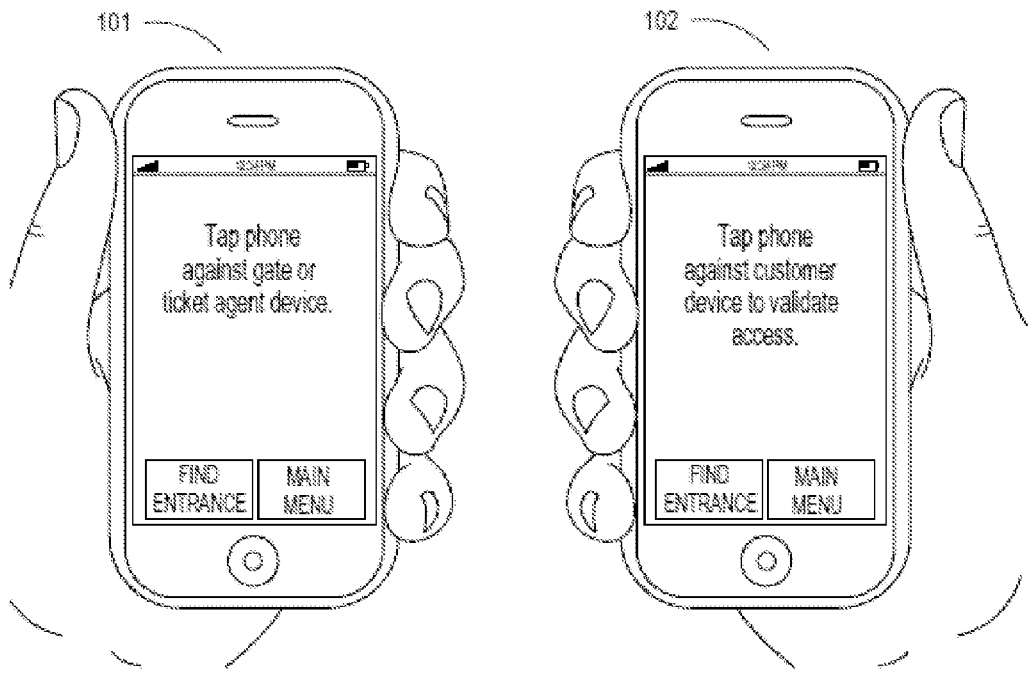
FIGS. 5A-D depict exemplary user interfaces according to one embodiment of the present disclosure.

FIG. 5A depicts an exemplary user interface of an application running on devices 101 and 102. In some embodiments, after users of devices 101 and 102 first launch an application, users are presented with a user interface as illustrated. The screen depicted instructs the user of each respective device to "tap" the devices together to conduct an access transaction. In the embodiment shown in FIGS. 5A-5D, an operator of the device 101 desires to gain access to a secured area (stadium, public transit, special members only line, etc.). An operator of device 102 may be a fare collector, ticket collector, line attendant, usher, or any other person at an establishment that restricts access to certain secured areas.

While the application is running on the devices 101 and 102, the remote server computer 102 may actively monitor communications from the devices 101 and 102. In other embodiments, the remote server computer does not actively monitor communications, and only analyzes the interaction data from the devices 101 and 102 when the interaction data is "pushed" onto the remote server computer 120 from the respective devices.

The user interface may include various features, including but not limited to a "Find Entrance" button shown on device 101, which uses location technology to find an entrance or usher, and "Main Menu." The location technology may be combined with a map program on the mobile device that shows the user a map and/or directions about where to find an entrance. For example, at a football stadium there may be many parking lots, and some of the parking lots may be closer to a entrance to the stadium that is close to the tickets seats. The Find Entrance key may direct the user to the appropriate parking lots and entrance. One of skill in the art will appreciate that the user interface may have additional hard or soft buttons.

Figure 5B:
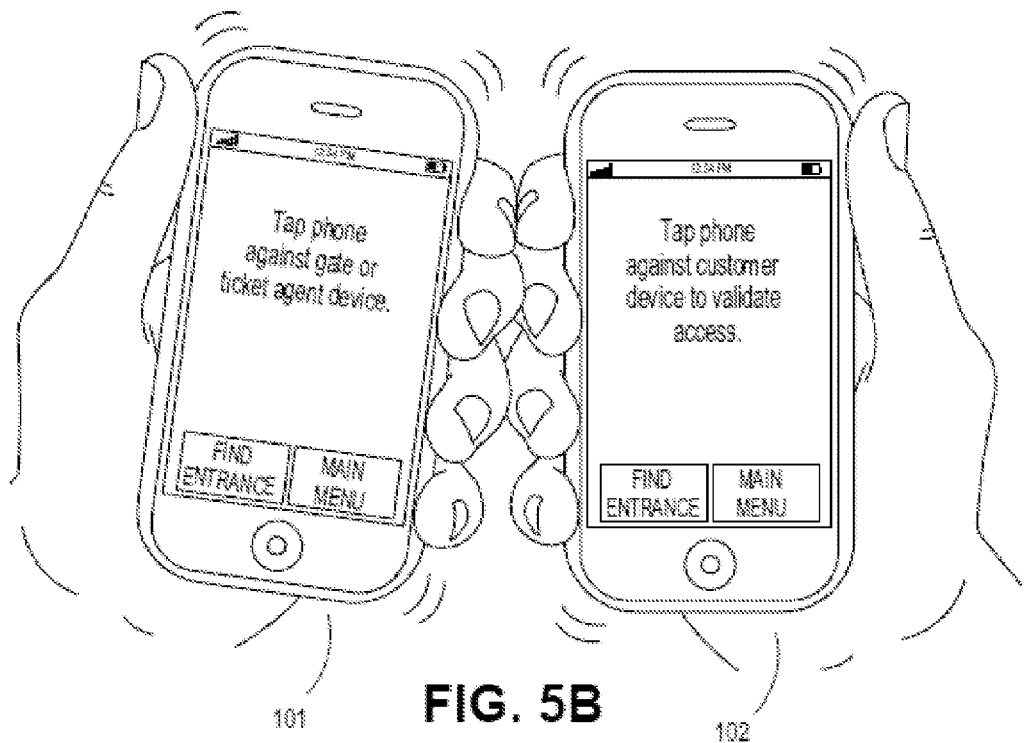

FIG. 5B shows two devices 101 and 102 just as the devices "bump" or "tap" together. After the devices 101 and 102 bump or tap together, accelerometer and other interaction data is generated. In some embodiments, accelerometer and other interaction data is stored in volatile memory on either or both of the device 101 and 102. In other embodiments, accelerometer and other interaction data is stored in non-volatile memory. Accelerometer and other interaction data may be sent to a remote server computer 120.

Figure 5C:
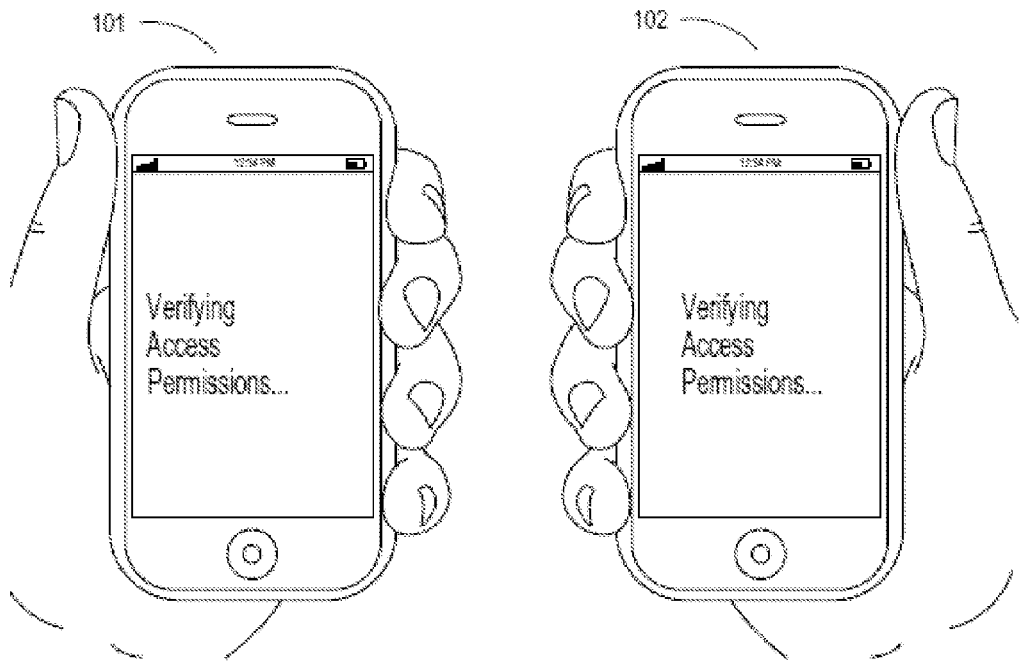

FIG. 5C shows devices 101 and 102 just after the devices "bump" or "tap" together. The user interface may display a message displaying the status of the access transaction, such as "Verifying Access Permissions." At this point, remote server computer 120 may be analyzing accelerometer and other interaction data to determine if the devices intentionally interacted, as shown in steps 401, 403, 405, and 407 in FIG. 4A and described above. After determining that the devices intentionally interacted, the remote server computer 120 determines whether the user of device 101 is permitted to access a particular secured area (steps 413, 415, and 417 in FIG. 4A).

Figure 5D:
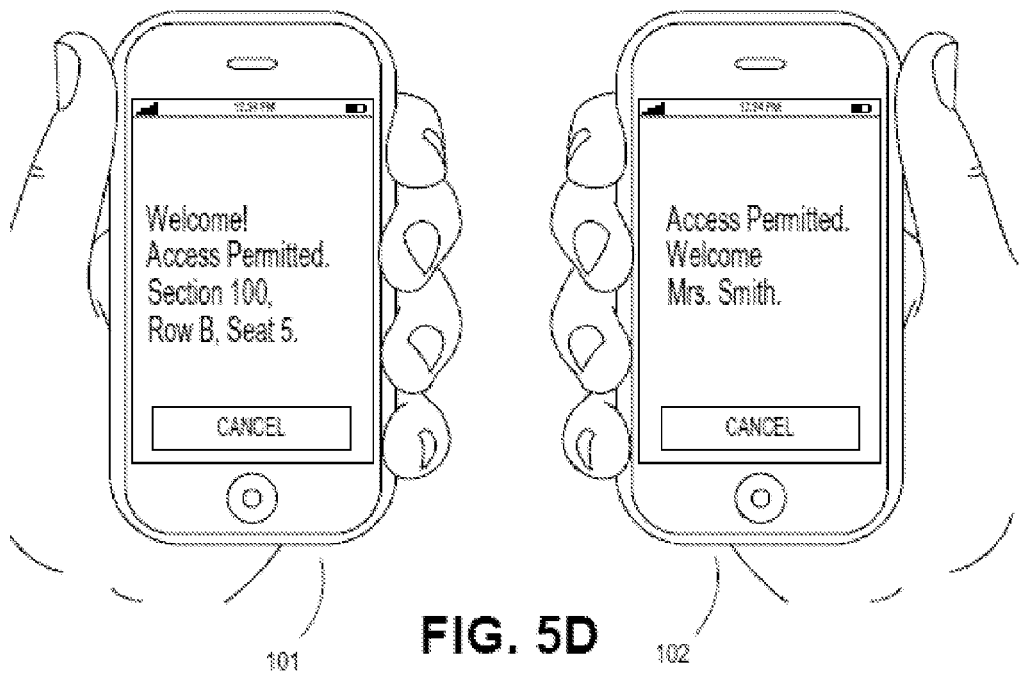

FIG. 5D shows devices 101 and 102 after remote server computer 120 has determined that the operator of device 101 is permitted to access a secured area. In an embodiment (not shown), an "Access Denied" message is displayed if access is not permitted to the secured area.

In addition to the "Access Permitted" or "Access Denied" messages, other information may be displayed on device 101 and/or 102. For example, on device 101, the user interface may include additional information access information, such as a personalized welcome message, seating information for an event, directions, or other information. Device 102 may display information for an employee, usher, or attendant to use. For example, it may display the name of the guest or patron so that the usher can appropriately address the user of device 101 (e.g., Mrs. Smith). Access information may include an alphanumeric representation or other representation of a location to which a user of the mobile device is permitted to access.

Figure 6A:
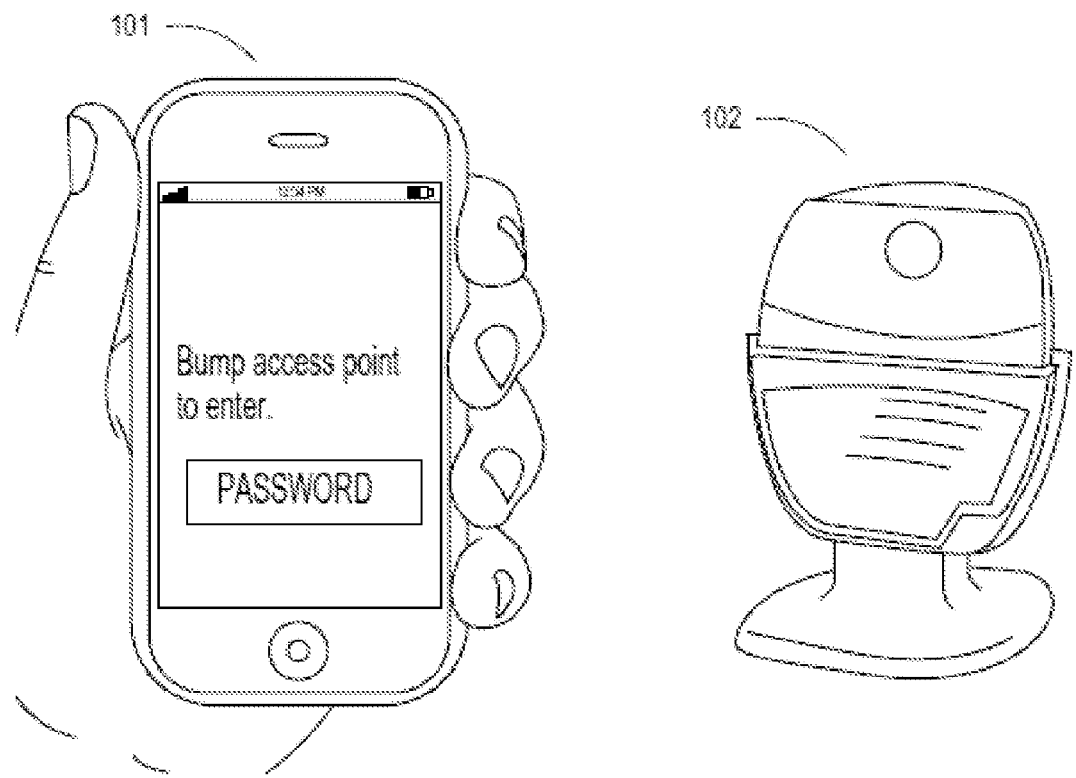
FIGS. 6A-B are high level diagrams illustrating embodiments of a mobile device and an access point device in accordance with the present disclosure.

FIG. 6A depicts an exemplary user interface of a device 101 used to interact with device 102. The device 102 may be an access point device. It may be in a fixed position. For example, the access point device may be attached to an object on or near a door, gate, entrance, or line. The access point device may be moveable. In some embodiments, a user of device 101 may be required to enter a password before bumping the device against access point device 102.

Figure 6B:
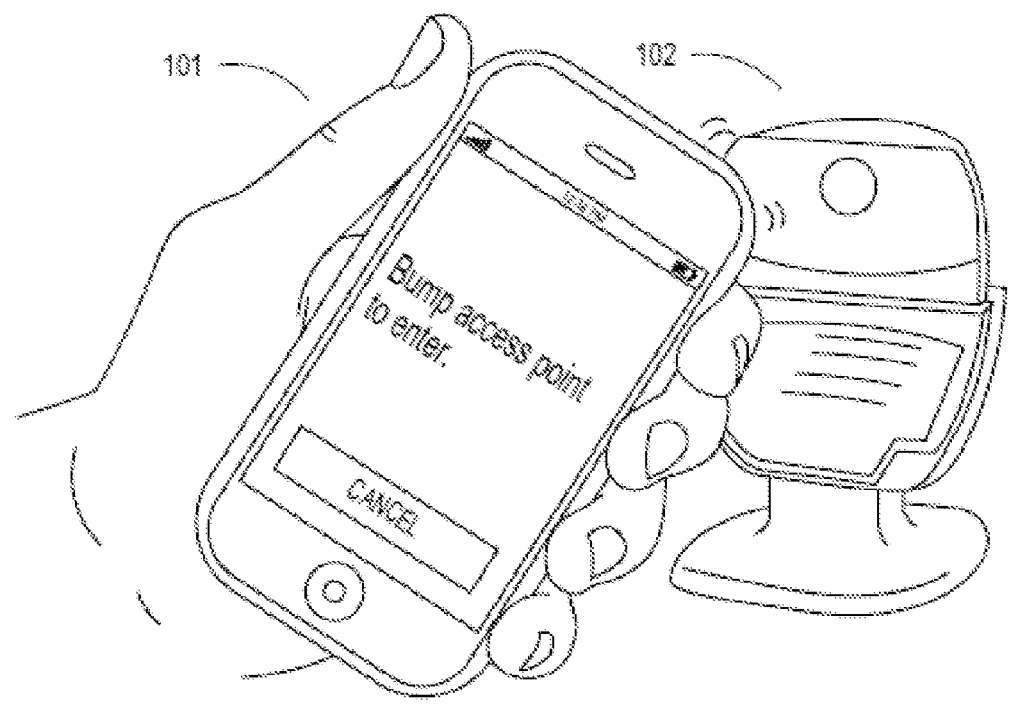

FIG. 6A shows the devices 101 and 102 before the devices interact. Before the devices interact, device 101 may prompt the user to bump the access point device. FIG. 6B shows the devices 101 and 102 as they make physical contact. The physical contact creates interaction data, which may be analyzed by a remote server as described above with respect to FIGS. 1-4.

IV. Exemplary Device

Figure 7:
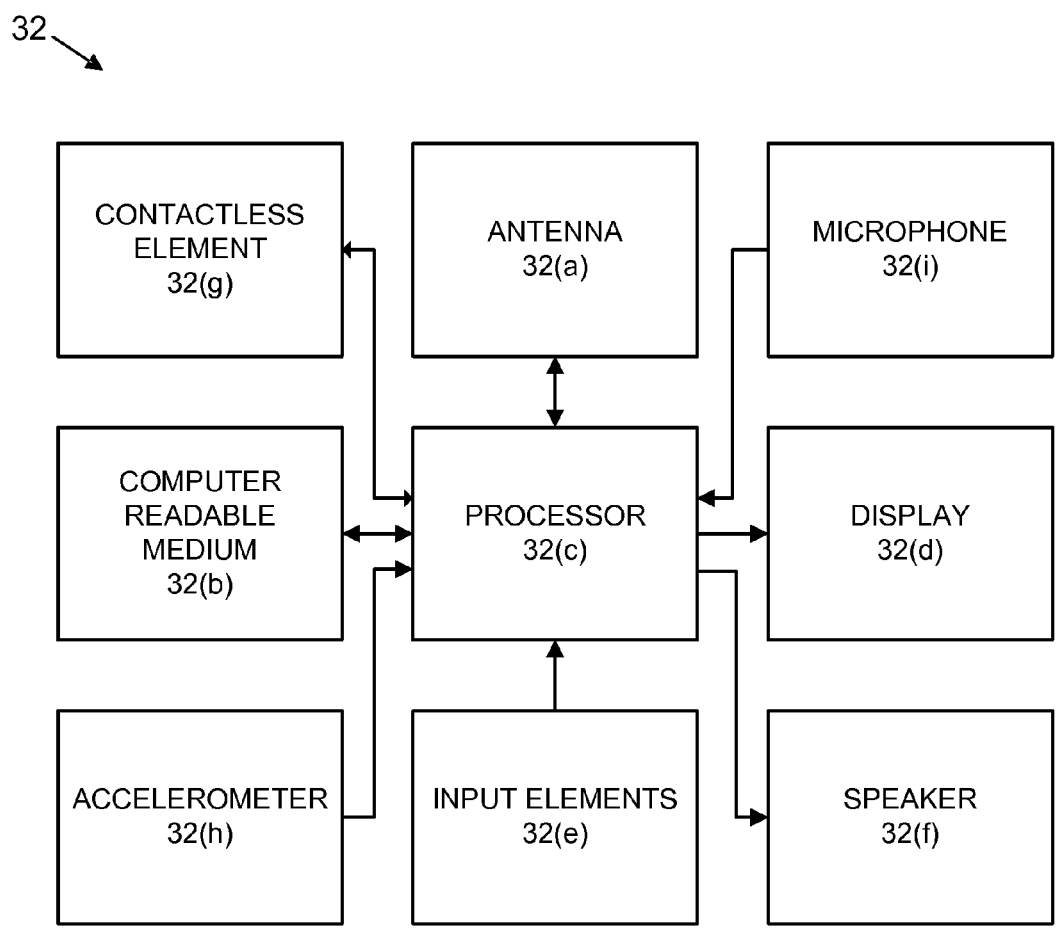
FIG. 7 shows a block diagram of a device in accordance with the present disclosure.

FIG. 7 shows a diagram of some components in an exemplary mobile device.

Whether or not a mobile phone is used, devices 101 and 102 may include one or more of the features shown in FIG. 7. If one of device 101 and 102 is a POS device, it may include one or more of the features in FIGS. 6A-B as well. However, in addition to the elements shown in FIG. 7, an exemplary POS device may also include a network interface as well as a reader (e.g., a card reader such as a magnetic stripe reader) for reading data from contactless or contact based cards or phones.

An exemplary mobile device 32 in the form of a phone (which may also serve as an access point device in some embodiments) may comprise a computer readable medium and a body. (FIG. 7 shows a number of components, and the mobile devices according to embodiments of the invention may comprise any suitable combination or subset of such components.) The computer readable medium 32(*b*) may be present within the body (not shown), or may be detachable from it. The body may be in the form of a plastic substrate, housing, or other structure. The computer readable medium 32(*b*) may be a memory that stores data and may be in any suitable form including a magnetic stripe, a memory chip, uniquely derived keys, encryption algorithms, etc. The memory also preferably stores information such as financial information, transit information (e.g., as in a subway or train pass), access information (e.g., as in access badges), etc. Financial information may include information such as bank account information, bank identification number (BIN), credit or debit card number information, account balance information, expiration date, consumer information such as name, date of birth, etc. Any of this information may be transmitted by the mobile device 32.

Information in the memory may also be in the form of data tracks that are traditionally associated with credit cards. Such tracks include Track 1 and Track 2. Track 1 ("International Air Transport Association") stores more information than Track 2, and contains the cardholder's name as well as account number and other discretionary data. This track is sometimes used by the airlines when securing reservations with a credit card. Track 2 ("American Banking Association") is currently most commonly used. This is the track that is read by ATMs and credit card checkers. The ABA (American Banking Association) designed the specifications of this track and all world banks must abide by it. It contains the cardholder's account, encrypted PIN, plus other discretionary data.

The mobile device 32 may further include a contactless element 32(*g*), which is typically implemented in the form of a semiconductor chip (or other data storage element) with an associated wireless transfer (e.g., data transmission) element, such as an antenna. Contactless element 32(*g*) is associated with (e.g., embedded within) mobile device 32 and data or control instructions transmitted via a cellular network may be applied to contactless element 32(*g*) by means of a contactless element interface (not shown). The contactless element interface functions to permit the exchange of data and/or control instructions between the mobile device circuitry (and hence the cellular network) and an optional contactless element 32(*g*).

Contactless element 32(*g*) is capable of transferring and receiving data using a near field communications ("NFC") capability (or near field communications medium) typically in accordance with a standardized protocol or data transfer mechanism (e.g., ISO 14443/NFC). Near field communications capability is a short-range communications capability, such as RFID, Bluetooth, infra-red, or other data transfer capability that can be used to exchange data between the mobile device 32 and an interrogation device. Thus, the mobile device 32 is capable of communicating and transferring data and/or control instructions via both a cellular network and a near field communications line or network.

The mobile device 32 may also include a processor 32(*c*) (e.g., a microprocessor) for processing the functions of the mobile device 32 and a display 32(*d*) to allow a consumer to see phone numbers and other information and messages. The mobile device 32 may further include input elements 32(*e*) to allow a consumer to input information into the device, a speaker 32(*f*) to allow the consumer to hear voice communication, music, etc., and a microphone 32(*i*) to allow the consumer to transmit her voice through the mobile device 32. The mobile device 32 may also include an antenna 32(*a*) for wireless data transfer (e.g., data transmission), and an accelerometer 32(*h*) which can provide acceleration data to the processor 32(*c*).

V. Exemplary System Elements

Figure 8:
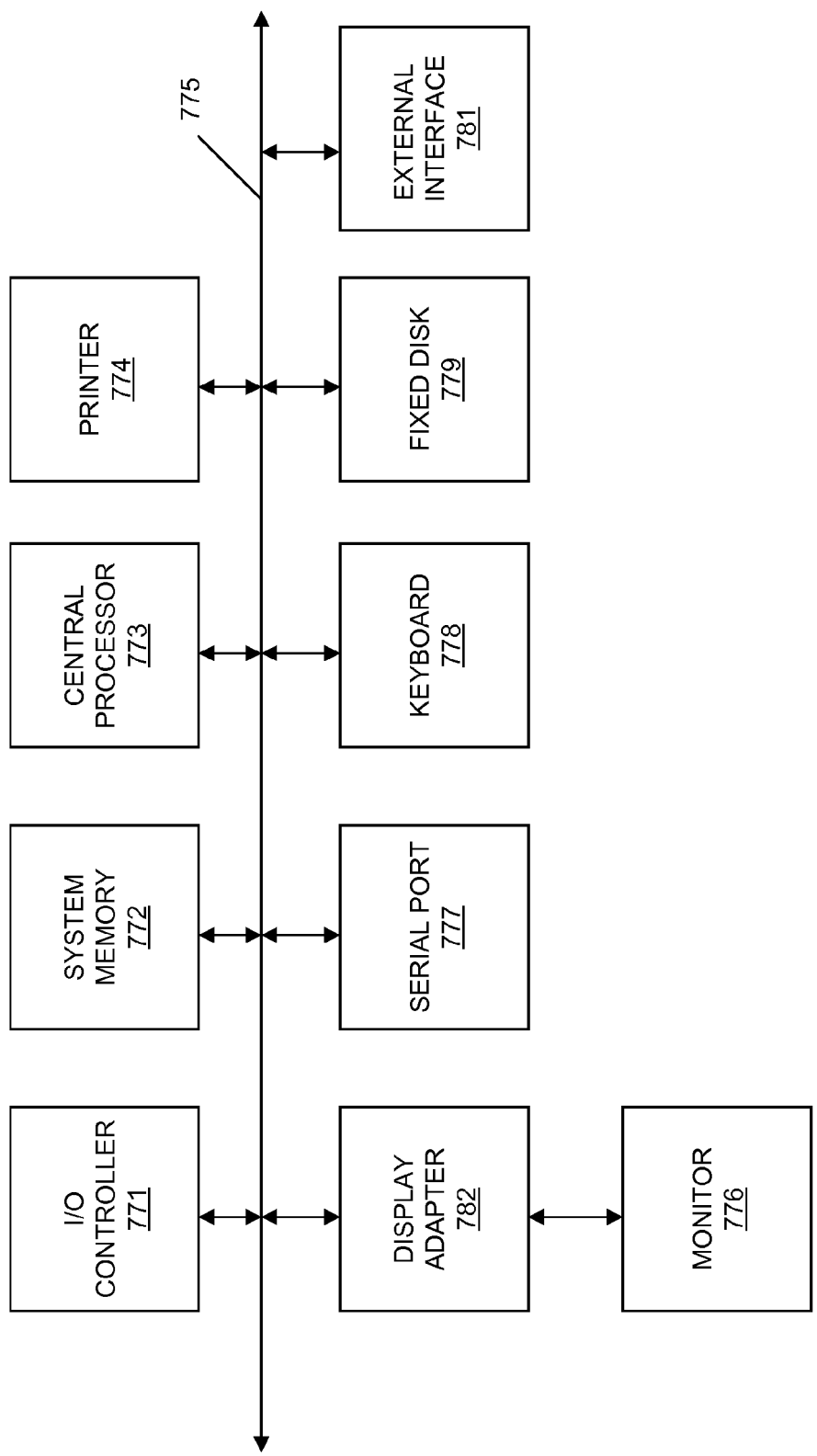
FIG. 8 shows a block diagram of a computer apparatus.

The various participants and elements in FIG. 8 may operate or use one or more computer apparatuses to facilitate the functions described herein. Any of the elements in FIGS. 1-2 ( ) may use any suitable number of subsystems to facilitate the functions described herein. Examples of such subsystems or components are shown in FIG. 8, which may illustrate parts of a computer apparatus.

The subsystems shown in FIG. 8 are interconnected via a system bus 775. Additional subsystems such as a printer 774, keyboard 778, fixed disk 779 (or other memory comprising computer readable media), monitor 776, which is coupled to display adapter 782, and others are shown. Peripherals and input/output (I/O) devices, which couple to I/O controller 771, can be connected to the computer system by any number of means known in the art, such as serial port 777. For example, serial port 777 or external interface 781 can be used to connect the computer apparatus to a wide area network such as the Internet, a mouse input device, or a scanner. The interconnection via system bus allows the central processor 773 to communicate with each subsystem and to control the execution of instructions from system memory 772 or the fixed disk 779, as well as the exchange of information between subsystems. The system memory 772 and/or the fixed disk 779 may embody a computer readable medium.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl, using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

VI. Technical Advantages

There are numerous technical advantages to the embodiments of the present invention. For example, a typical access transaction merely verifies static data on a card. Access transactions of the present invention use data that may use interaction data that is not static, such as accelerometer, time, and location data. This makes access transaction more secure and hard to spoof. In confirmation transactions, the interaction data comprises any combination of accelerometer, time, and location data. Because dynamic data for the confirmation transaction, the transaction is more secure and it can be determined with greater certainty that a person was at a particular location at a particular time.

Specialized access terminals (e.g., stationary security doors with card readers) require specialized hardware that can be expensive, not readily available, and difficult to set up in smaller scale implementations. Embodiments of the present invention allow quickly customizable access control mechanisms that can be set up and changed as needed without great expense. For example, at a farmers or flea market that is open only once a week (or at differing locations each day of the week), embodiments of the present invention allow a mobile smart phone with an accelerometer to be used as a an access gate. Thus, one advantage is that you can use an ordinary mobile device in order to keep track of who has entered a place. Similarly, in "confirmation transaction," the location that is being confirmed may be changed periodically. Because embodiments of the present invention permit use of an ordinary mobile device in order to keep track of who has visited a particular place, the confirmed location can be easily changed.

What is claimed is:

1. A mobile device comprising:
    a processor;
    a sensor coupled to the processor; and
    a memory coupled to the processor and storing machine readable code, which when executed by the processor, causes the mobile device to:
    generate first sensor data using the sensor of the mobile device to facilitate a transaction being conducted with the mobile device, wherein the sensor is a motion or pressure sensor and measures an external force caused by a physical interaction;
    initiate comparison of first interaction data with second interaction data, the first interaction data including first location data and the first sensor data of the mobile device, the second interaction data including second location data and second sensor data of a terminal device, wherein the first location data is compared with the second location data to determine whether the first location data corresponds to the second location data, and the first sensor data is compared with the second sensor data after comparison of the first location data and the second location data to determine whether the mobile device and the terminal device physically interacted with each other; and
    receive a transaction message when the mobile device and the terminal device are determined to have physically interacted with each other, wherein the transaction message indicates whether or not the transaction is approved.

2. The mobile device of claim 1, wherein the first interaction data further includes first time data, and the second interaction data further includes second time data.

3. The mobile device of claim 2, wherein the first time data is compared with the second time data before comparison of the first location data and the second location data.

4. The mobile device of claim 1, wherein the first sensor data comprises accelerometer data that represents an acceleration generated by the physical interaction.

5. The mobile device of claim 1, wherein the comparison of the first interaction data with the second interaction data is performed at a remote server computer.

6. The mobile device of claim 5, wherein the machine readable code, which when executed by the processor, further causes the mobile device to:
    receive a session key from the remote server computer when the mobile device and the terminal device are determined to have physically interacted with each other; and
    establish communication between the mobile device and the terminal device using the session key.

7. The mobile device of claim 6, wherein the session key is generated based on at least one of the first sensor data or the second sensor data.

8. The mobile device of claim 1, wherein the terminal device is an access point device or a point-of-sale device.

9. The mobile device of claim 1, wherein the terminal device is another mobile device.

10. The mobile device of claim 1, wherein the transaction is an access transaction, a confirmation transaction, or a payment transaction.

11. A method for conducting a transaction using a mobile device, the method comprising:
    generating first sensor data using a sensor of the mobile device, wherein the sensor is a motion or pressure sensor and measures an external force caused by a physical interaction;
    initiating comparison of first interaction data with second interaction data, the first interaction data including first location data and the first sensor data of the mobile device, the second interaction data including second location data and second sensor data of a terminal device, wherein the first location data is compared with the second location data to determine whether the first location data corresponds to the second location data, and the first sensor data is compared with the second sensor data after comparison of the first location data and the second location data to determine whether the mobile device and the terminal device physically interacted with each other; and
    receiving a transaction message when the mobile device and the terminal device are determined to have physically interacted with each other, wherein the transaction message indicates whether or not the transaction is approved.

12. The method of claim 11, wherein the first interaction data further includes first time data, and the second interaction data further includes second time data.

13. The method of claim 12, wherein the first time data is compared with the second time data before comparison of the first location data and the second location data.

14. The method of claim 11, wherein the first sensor data comprises accelerometer data that represents an acceleration generated by the physical interaction.

15. The method of claim 11, wherein the comparison of the first interaction data with the second interaction data is performed at a remote server computer.

16. The method of claim 15, further comprising:
    receiving a session key from the remote server computer when the mobile device and the terminal device are determined to have physically interacted with each other; and
    establishing communication between the mobile device and the terminal device using the session key.

17. The method of claim 16, wherein the session key is generated based on at least one of the first sensor data or the second sensor data.

18. The method of claim 11, wherein the terminal device is an access point device or a point-of-sale device.

19. The method of claim 11, wherein the terminal device is another mobile device.

20. The method of claim 11, wherein the transaction is an access transaction, a confirmation transaction, or a payment transaction.

* * * * *